(12) United States Patent
Lim

(10) Patent No.: US 9,560,421 B2
(45) Date of Patent: Jan. 31, 2017

(54) BROADCAST AND BROADBAND HYBRID SERVICE WITH MMT AND DASH

(71) Applicant: Samsung Electronics Co., Ltd., Suwon-si, Gyeonggi-do (KR)

(72) Inventor: Youngkwon Lim, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/567,618

(22) Filed: Dec. 11, 2014

(65) Prior Publication Data

US 2015/0281799 A1 Oct. 1, 2015

Related U.S. Application Data

(60) Provisional application No. 61/971,387, filed on Mar. 27, 2014.

(51) Int. Cl.
| | | |
|---|---|---|
| *H04N 5/445* | (2011.01) | |
| *H04N 21/63* | (2011.01) | |
| *H04N 21/643* | (2011.01) | |
| *H04L 29/06* | (2006.01) | |
| *H04N 21/2381* | (2011.01) | |

(Continued)

(52) U.S. Cl.
CPC ...... *H04N 21/631* (2013.01); *H04L 29/06544* (2013.01); *H04L 65/4076* (2013.01); *H04L 65/608* (2013.01); *H04L 67/02* (2013.01); *H04N 21/2381* (2013.01); *H04N 21/2665* (2013.01); *H04N 21/6125* (2013.01); *H04N 21/6175* (2013.01); *H04N 21/64322* (2013.01); *H04N 21/85406* (2013.01)

(58) Field of Classification Search
CPC .................................................. H04N 21/4316
See application file for complete search history.

(56) References Cited

U.S. PATENT DOCUMENTS

| 8,584,185 B2 | 11/2013 | Swix et al. |
| 9,043,849 B2 * | 5/2015 | Yie .......................... H04H 60/73 |
| | | 725/116 |

(Continued)

FOREIGN PATENT DOCUMENTS

| WO | WO 2013077697 A1 | 5/2013 |
| WO | WO 2013077698 A1 | 5/2013 |

OTHER PUBLICATIONS

International Search Report dated Jun. 29, 2015 in connection with Application No. PCT/KR2015/003040, 3 pages.

(Continued)

*Primary Examiner* — Michael Hong

(57) ABSTRACT

Method and apparatuses for broadcasting and receiving media data over a heterogeneous network. A method for receiving media data includes receiving and processing media data broadcast using MMTP packets via a broadcast network. The method also includes, in response to receiving a signaling message associated with the broadcast media data, determining whether broadband media data associated with the broadcast media data is available via a broadband network based on the signaling message. The method includes receiving the broadband media data using DASH via the broadband network. Additionally, the method includes providing the broadband media data in association with the broadcast media data for presentation via a display device.

20 Claims, 4 Drawing Sheets

(51) Int. Cl.
*H04N 21/61* (2011.01)
*H04N 21/2665* (2011.01)
*H04L 29/08* (2006.01)
*H04N 21/854* (2011.01)

(56) References Cited

U.S. PATENT DOCUMENTS

2013/0016282 A1   1/2013   Kim et al.
2014/0259049 A1*  9/2014   Wang .................. H04N 21/812
                                                                725/32
2014/0325572 A1   10/2014  Yie et al.
2014/0334504 A1   11/2014  Yie et al.

OTHER PUBLICATIONS

Written Opinion of the International Searching Authority dated Jun. 29, 2015 in connection with Application No. PCT/KR2015/003040, 6 pages.
Lim, et al.; "MMT: An Emerging MPEG Standard for Multimedia Delivery over the Internet"; IEEE, vol. 20, Issue 1; Feb. 13, 2013; 7 pages.

* cited by examiner

BROADCAST AND BROADBAND HYBRID SERVICE WITH MMT AND DASH

CROSS-REFERENCE TO RELATED APPLICATION AND CLAIM OF PRIORITY

The present application claims priority under 35 U.S.C. §119(e) to U.S. Provisional Patent Application Ser. No. 61/971,387, filed Mar. 27, 2014, entitled "METHODS AND APPARATUS FOR BROADCAST AND BROADBAND HYBRID SERVICE WITH MMT AND DASH." The above-identified provisional patent application is hereby incorporated by reference in its entirety.

TECHNICAL FIELD

The present application relates generally to media data delivery and presentation and, more specifically, to broadcast and broadband hybrid service with Moving Picture Experts Group (MPEG) media transport (MMT) and dynamic adaptive streaming over hyper-text transport protocol (HTTP) (DASH).

BACKGROUND

MMT is a digital container standard or format that specifies technologies for the delivery of coded media data for multimedia service over heterogeneous IP network environments. The delivered coded media data includes both audio-visual media data requiring synchronized decoding and presentation of a specific unit of data in a designated time, namely timed data, and other types of data that are decoded and presented in an arbitrary time based on the context of service or interaction by the user, namely non-timed data.

DASH is an adaptive bitrate streaming technique that allows for streaming of media data over the Internet from web servers using HTTP. Traditionally, standards and protocols for delivering and receiving MMT content and DASH content have been separate.

SUMMARY

This disclosure provides broadcast and broadband hybrid service with MMT and DASH.

In one exemplary embodiment, a method for receiving media data over a heterogeneous network is provided. The method includes receiving and processing media data broadcast using MMTP packets via a broadcast network. The method also includes, in response to receiving a signaling message associated with the broadcast media data, determining whether broadband media data associated with the broadcast media data is available via a broadband network based on the signaling message. The method includes receiving the broadband media data using DASH via the broadband network. Additionally, the method includes providing the broadband media data in association with the broadcast media data for presentation via a display device.

In another exemplary embodiment, an apparatus for receiving media data over a heterogeneous network is provided. The apparatus includes one or more receivers configured to receive media data broadcast using MMTP packets via a broadcast network and a controller. The controller is configured to determine, in response receipt of a signaling message associated with the broadcast media data, whether broadband media data associated with the broadcast media data is available via a broadband network based on the signaling message. The controller is configured to control the one or more receivers to receive the broadband media data using DASH via the broadband network. Additionally, the controller is configured to provide the broadband media data in association with the broadcast media data for presentation via a display device.

In yet another exemplary embodiment, a non-transitory computer-readable medium comprising a program for receiving media data over a heterogeneous network is provided. The program comprises program code for receiving and processing media data broadcast using MMTP packets via a broadcast network. The program comprises program code for determining, in response to receiving a signaling message associated with the broadcast media data, whether broadband media data associated with the broadcast media data is available via a broadband network based on the signaling message. The program comprises program code for receiving the broadband media data using DASH via the broadband network. Additionally, the program comprises program code for providing the broadband media data in association with the broadcast media data for presentation via a display device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 6, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

MMT coding and media delivery is discussed in the following document and standards description: MPEG-H Systems, Text of ISO/IEC 2nd CD 23008-1 MPEG Media Transport, which is hereby incorporated into the present disclosure as if fully set forth herein. MMT defines three functional areas including encapsulation, delivery, and signaling. The encapsulation functional area defines the logical structure of media content, the MMT package, and the format data units to be processed by an MMT compliant entity. An MMT package specifies components including media content and the relationship among the media content to provide information needed for adaptive delivery. The format of the data units is defined to encapsulate the coded media to either be stored or carried as a payload of a delivery protocol and to be easily converted between storage and carrying. The delivery functional area defines the application layer protocol and format of the payload. The application layer protocol provides enhanced features, including multiplexing, for delivery of the MMT package compared to conventional application layer protocols for the delivery of multimedia. The payload format is defined to carry coded media data that is agnostic to the specific media type or encoding method. The signaling functional area defines the format of messages to manage delivery and consumption of MMT packages. Messages for consumption management are used to signal the structure of the MMT package, and messages for delivery management are used to signal the structure of payload format and configuration of the protocol.

MMT defines a new framework for delivery of time continuous multimedia, such as audio, video, and other static content, such as widgets, files, etc. MMT specifies a protocol (i.e., MMTP) for the delivery of an MMT package to a receiving entity. The MMTP signals transmission time of the MMTP package as part of the protocol header. This time enables the receiving entity to perform de-jittering by examining the transmission time and reception time of each incoming MMT packet.

Figure 1:
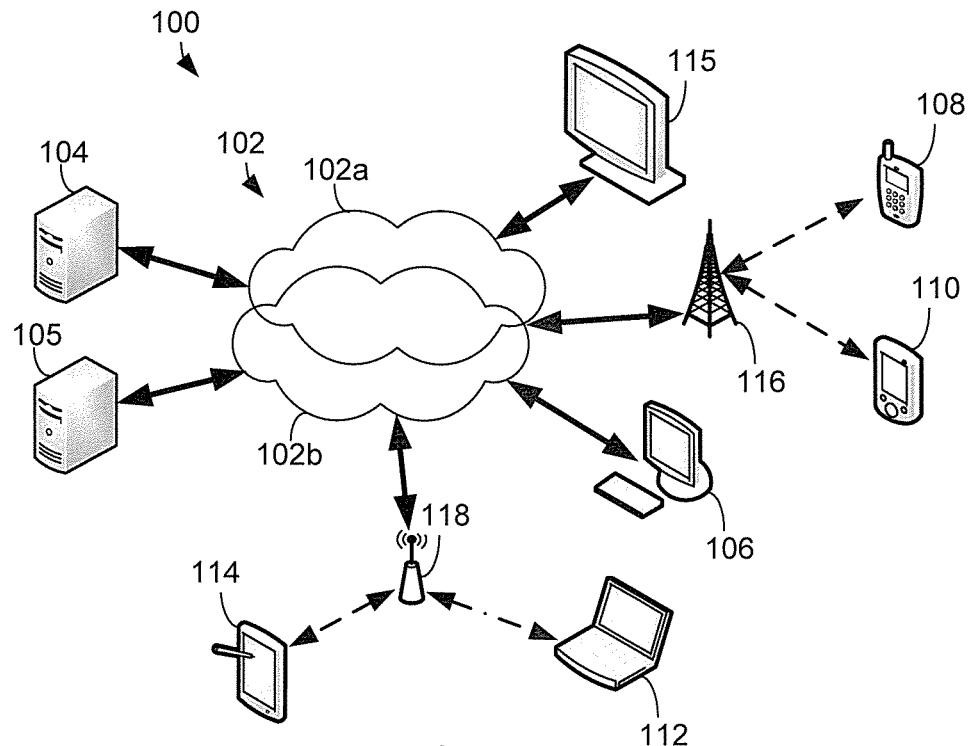
FIG. 1 illustrates an example communication system in which various embodiments of the present disclosure may be implemented.

FIG. 1 illustrates an example communication system 100 in which various embodiments of the present disclosure may be implemented. The embodiment of the communication system 100 shown in FIG. 1 is for illustration only. Other embodiments of the communication system 100 could be used without departing from the scope of this disclosure.

As shown in FIG. 1, the system 100 includes a heterogeneous network 102, which facilitates communication between various components in the system 100. For example, the network 102 may communicate Internet Protocol (IP) packets, frame relay frames, Asynchronous Transfer Mode (ATM) cells, or other information between network addresses. The network 102 may also be a heterogeneous network including broadcasting networks, such as cable and satellite communication links. The network 102 may include one or more local area networks (LANs); metropolitan area networks (MANs); wide area networks (WANs); all or a portion of a global network, such as the Internet; or any other communication system or systems at one or more locations.

In various embodiments, heterogeneous network 102 includes a broadcast network 102a and a broadband network 102b. Broadcast network 102a is designed for broadcast of media data to client devices 106-115 which is generally one way, e.g., from one or more of the servers 104-105 to the client devices 106-115. Broadcast network 102a may include any number of broadcast links and devices, such as, for example, satellite, wireless, wireline, and fiber optic network links and devices.

Broadband network 102b is designed for broadband access to media data for client devices 106-115 which is generally two way, e.g., back and forth from one or more of the servers 104-105 to the client devices 106-115. Broadband network 102b may include any number of Broadband links and devices, such as, for example, Internet, wireless, wireline, and fiber optic network links and devices.

The network 102 facilitates communications between servers 104-105 and various client devices 106-115. Each of the servers 104-105 includes any suitable computing or processing device that can provide computing services for one or more client devices. Each of the servers 104-105 could, for example, include one or more processing devices, one or more memories storing instructions and data, and one or more network interfaces facilitating communication over the network 102. For example, the servers 104-105 may include servers that broadcast media data over a broadcast network in network 102 using MMTP. In another example, the servers 104-105 may include servers that broadcast media data over a broadcast network in network 102 using DASH.

Each client device 106-115 represents any suitable computing or processing device that interacts with at least one server or other computing device(s) over the network 102. In this example, the client devices 106-115 include a desktop computer 106, a mobile telephone or smartphone 108, a personal digital assistant (PDA) 110, a laptop computer 112, a tablet computer 114; and a set-top box and/or television 115. However, any other or additional client devices could be used in the communication system 100.

In this example, some client devices 108-114 communicate indirectly with the network 102. For example, the client devices 108-110 communicate via one or more base stations 116, such as cellular base stations or eNodeBs. Also, the client devices 112-115 communicate via one or more wireless access points 118, such as IEEE 802.11 wireless access points. Note that these are for illustration only and that each client device could communicate directly with the network 102 or indirectly with the network 102 via any suitable intermediate device(s) or network(s). As described in more detail below, any and all of the client devices 106-115 may include a hybrid architecture for receiving and presenting broadcast and broadband media data using MMT and DASH.

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
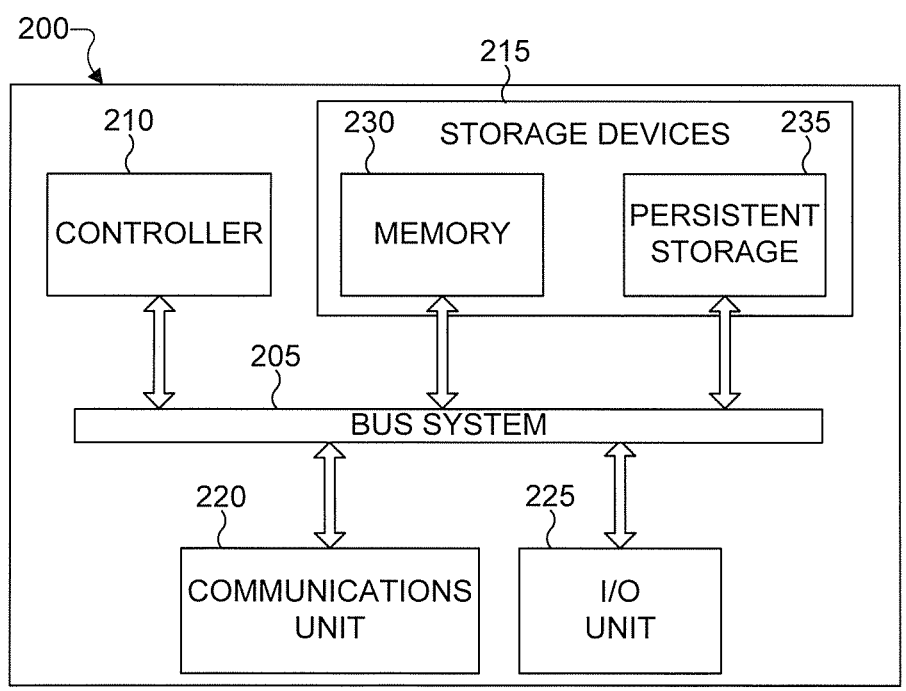
FIGS. 2 and 3 illustrate example devices in a communication system according to this disclosure.
Figure 3:
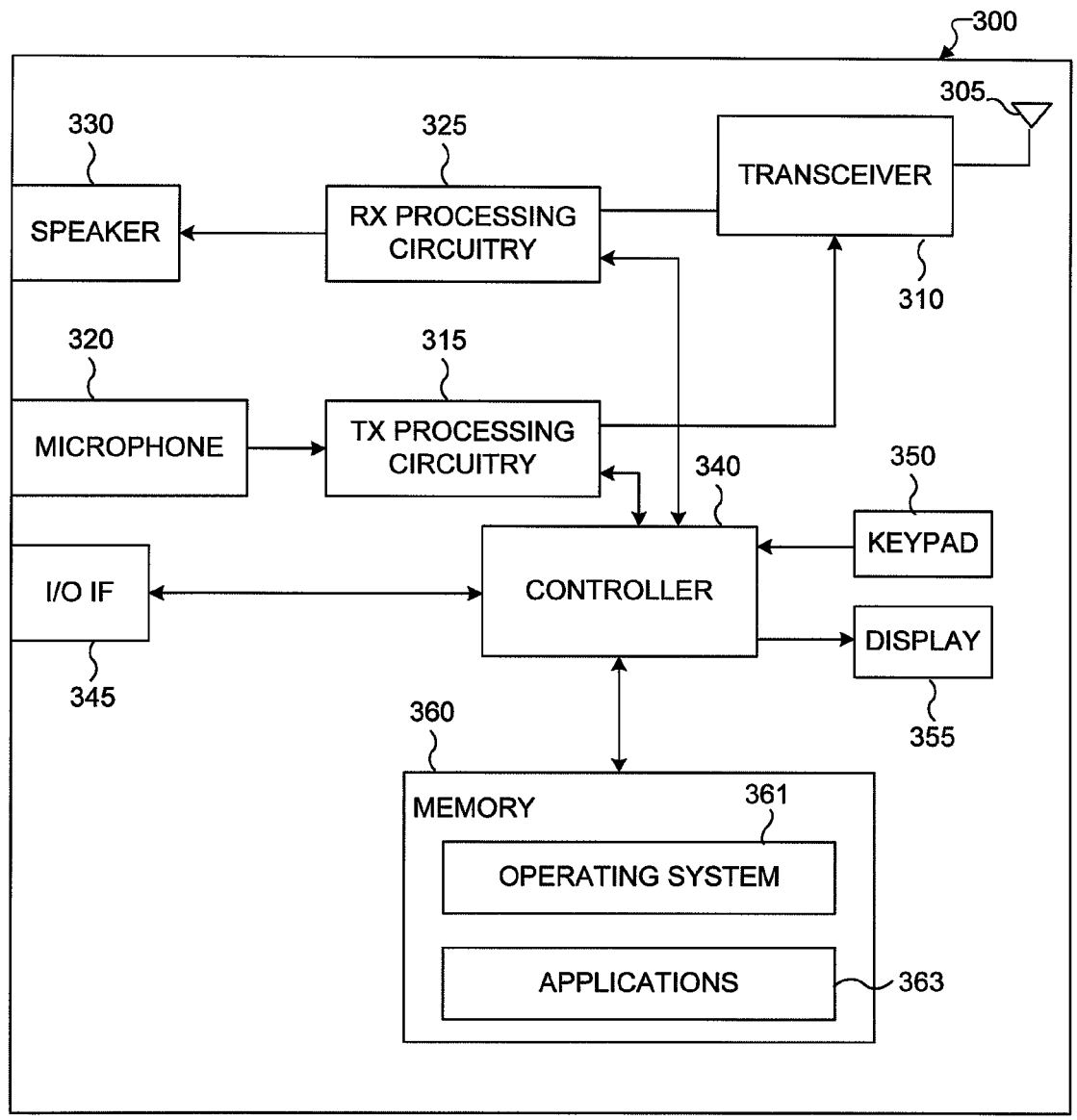

FIGS. 2 and 3 illustrate example devices in a computing system according to this disclosure. In particular, FIG. 2 illustrates an example server 200, and FIG. 3 illustrates an example client device 300. The server 200 could represent the servers 104-105 in FIG. 1, and the client device 300 could represent one or more of the client devices 106-115 in FIG. 1.

As shown in FIG. 2, the server 200 includes a bus system 205, which supports communication between at least one controller 210, at least one storage device 215, at least one communications unit 220, and at least one input/output (I/O) unit 225.

The controller 210 executes instructions that may be loaded into a memory 230. The controller 210 may include any suitable number(s) and type(s) of processor or other device in any suitable arrangement. Example types of controllers 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a read-only memory, hard drive, Flash memory, or optical disc.

The communications unit 220 supports communications with other systems or devices. For example, the communications unit 220 could include a network interface card, a transmitter, a receiver, a satellite communications system, or a wireless transceiver facilitating communications over the network 102. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Note that while FIG. 2 is described as representing the server 104 of FIG. 1, the same or similar structure could be used in one or more of the client devices 106-115. For example, a laptop or desktop computer could have the same or similar structure as that shown in FIG. 2.

As described in more detail below, server 200 may broadcast media data over a broadcast network using MMTP. Server 200 may also send signaling messages including information about associated broadband media data that is available from a broadband server using DASH. In another example, server 200 may be the broadband server that provides the broadband media data associated with the broadcast media data using DASH. In yet another example, server 200 may provide both broadcast media data and associated broadband media data.

As shown in FIG. 3, the client device 300 includes an antenna 305, a transceiver 310, transmit (TX) processing circuitry 315, a microphone 320, and receive (RX) processing circuitry 325. The client device 300 also includes a speaker 330, a controller 340, an input/output (I/O) interface (IF) 345, a keypad 350, a display 355, and a memory 360. The memory 360 includes an operating system (OS) 361 and one or more applications 363.

The transceiver 310 receives, from the antenna 305, an incoming RF signal transmitted by another component in a system. The transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the controller 340 for further processing (such as for web browsing data).

The TX processing circuitry 315 receives analog or digital voice data from the microphone 320 or other outgoing baseband data (such as web data, e-mail, or interactive video game data) from the controller 340. The TX processing circuitry 315 encodes, multiplexes, and/or digitizes the outgoing baseband data to generate a processed baseband or IF signal. The transceiver 310 receives the outgoing processed baseband or IF signal from the TX processing circuitry 315 and up-converts the baseband or IF signal to an RF signal that is transmitted via the antenna 305.

The controller 340 can include one or more processors or other processing devices and execute the basic operating system 361 stored in the memory 360 in order to control the overall operation of the client device 300. For example, the controller 340 could control the reception of forward channel signals and the transmission of reverse channel signals by the transceiver 310, the RX processing circuitry 325, and the TX processing circuitry 315 in accordance with well-known principles. In some embodiments, the controller 340 includes at least one microprocessor or microcontroller.

The controller 340 is also capable of executing other processes and programs resident in the memory 360. The controller 340 can move data into or out of the memory 360 as required by an executing process. In some embodiments, the controller 340 is configured to execute the applications 363 based on the operating system 361 or in response to signals received from external devices or an operator. The controller 340 is also coupled to the I/O interface 345, which provides the client device 300 with the ability to connect to other devices, such as laptop computers and handheld computers. The I/O interface 345 is the communication path between these accessories and the controller 340.

The controller 340 is also coupled to the keypad 350 and the display 355. The operator of the client device 300 can use the keypad 350 to enter data into the client device 300. The display 355 may be a liquid crystal display or other display capable of rendering text and/or at least limited graphics, such as from web sites.

The memory 360 is coupled to the controller 340. Part of the memory 360 could include a random access memory (RAM), and another part of the memory 360 could include a Flash memory or other read-only memory (ROM).

As described in more detail below, client device 300 may include a hybrid architecture for receiving and presenting broadcast and broadband media data using MMT and DASH.

Although FIGS. 2 and 3 illustrate examples of devices in a computing system, various changes may be made to FIGS. 2 and 3. For example, various components in FIGS. 2 and 3 could be combined, further subdivided, or omitted, and additional components could be added according to particular needs. As a particular example, the controller 340 could be divided into multiple processors, such as one or more central processing units (CPUs) and one or more graphics processing units (GPUs). Also, while FIG. 3 illustrates the client device 300 configured as a mobile telephone or smartphone, client devices could be configured to operate as other types of mobile or stationary devices including, for example, without limitation, a set-top box, a television, and a media streaming device. In addition, as with computing and communication networks, client devices and servers can come in a wide variety of configurations, and FIGS. 2 and 3 do not limit this disclosure to any particular client device or server.

Embodiments of the present disclosure recognize that one of the key features for next generation broadcasting service is hybrid service using both broadcast network and broadband network to enable personalized services, such as, for example, personalized ad insertion. For media delivery, hyper-text mark-up language (HTML) 5 used as a presentation language and MMT and DASH are used for broadcast delivery and broadband delivery, respectively.

Embodiments of the present disclosure recognize that HTML5 does not provide a way to efficiently describe media components from both broadcast delivery and broadband delivery networks and synchronization information of such components coming from both delivery networks. Embodiments of the present disclosure recognize that the MMT implementation guideline only provides a method to synchronize clock references between MMT Assets and MPEG-2 TS.

Accordingly, embodiments of the present disclosure enable hybrid services using MMT for broadcast delivery and DASH for broadband delivery. Embodiments of the present disclosure provide a method and system for describing information about media components from a broadcast delivery network using MMT Protocol and from a broadband network by HTTP with DASH. Embodiments of the present disclosure further provide synchronization information of such components coming from both delivery networks.

Figure 4:
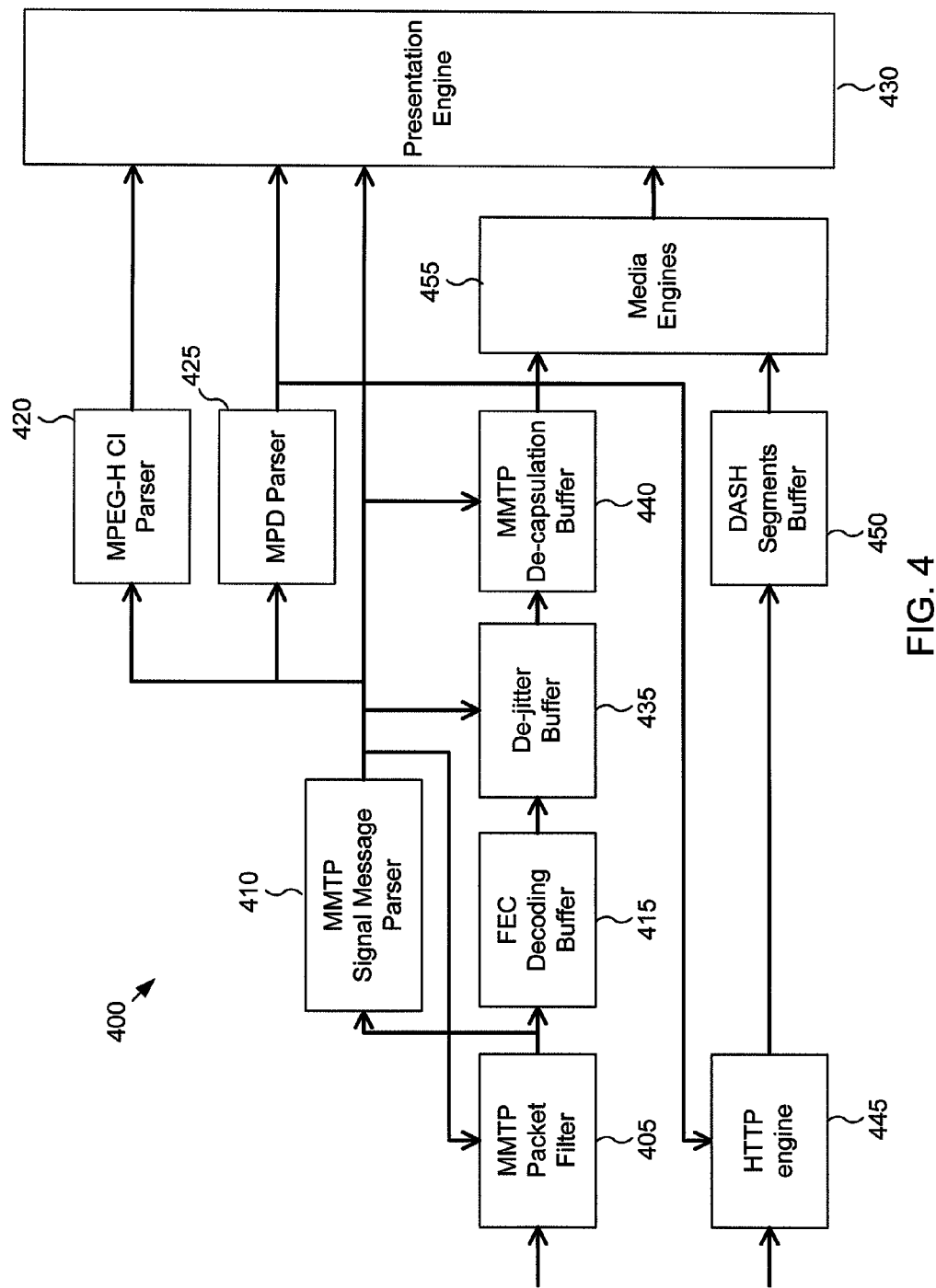
FIG. 4 illustrates an example architecture of a client device for broadcast and broadband hybrid service with MMT and DASH according to this disclosure.

FIG. 4 illustrates an example architecture of a client device 400 for broadcast and broadband hybrid service with MMT and DASH according to this disclosure. In this illustrative example, the client device 400 could represent one or more of the client devices 106-115 in FIG. 1.

Client device 400 includes an MMTP packet filter 405 that receives MMTP packets from a broadcast network, such as broadcast network 102a, and delivers the MMTP packets to an appropriate processing block. For example, the MMTP packet filter 405 may send packets containing media data to the FEC decoding buffer 415 for processing and ultimately presentation and packets containing signaling information to the MMTP signal message parser 410. The MMTP packet filter 405 may identify where to route the packet, for example, based on a packet identifier (e.g., packet_id) of each of the received MMTP packets.

When the client device 400 is tuned into the specific service, the MMTP packet filter 405 may only be given the packet identifier of MMTP signaling messages by a processing block. After an MMT package table message (e.g., MPT_message) is processed by the MMTP signaling message parser 410, the MMTP packet filter 405 is given the packet identifier of a media component and starts to filter MMTP packets with the media component.

The MMTP signal message parser 410 receives MMTP packets from the MMTP packet filter 405 and parses the MMTP signaling message carried in the packet. The MMTP signal message parser 410 routes information retrieved from the MMTP signaling message for delivery to appropriate processing blocks as discussed in greater detail below.

When the client device 400 is tuned into the specific service, the MMTP signal message parser 410 first looks for the MPT message and processes the MPT message to identify a list of MMT assets and their respective packet identifiers. When an MMT presentation information message (e.g., MPI_message) is received, the MMTP signal message parser 410 processes presentation information content type information (e.g., a PI_content_type_byte field) of the MPI table (e.g., the MPT_table( )). The MMTP signal message parser 410 then delivers the data carried there (e.g., carried as the PI_content_byte of the MPI_table( )) the MPEG-H composition information (CI) parser 420, the media presentation description (MPD) parser 425, or the presentation engine 430. For example, if the value of the presentation information (e.g., the PI_content_type_byte) is HTML5, the MMTP signal message parser 410 then delivers this data to the presentation engine 430. If the value of the presentation information (e.g., the PI_content_type_byte) is MPEG-H CI, the MMTP signal message parser 410 then delivers this data to MPEG-H CI parser 420. If the value of the presentation information (e.g., the PI_content_type__byte) is DASH MPD, the MMTP signal message parser 410 then delivers this data to MPD parser 425.

When an application-layer forward-error-correction (AL-_FEC) message is received, the information in the message is provided to the FEC decoding buffer 415 for use in forward error correction. When a hypothetical receiver buffer model (HRBM) message is received, the information in this message is provided to the de-jitter buffer 435.

The MPEG-H CI parser 420 receives and processes MPEG-H CIs from the MMTP signal message parser 410. The MPEG-H CI parser 420 identifies the presentation time of the first access unit of an MPU from a 'Media Sync' element referencing the MPU and delivers this relative presentation time to the presentation engine 430 for presentation at the prescribed presentation time via a display, such as the display 355 in FIG. 3. The MPD parser 425 receives and processes DASH MPD files from the MMTP signal message parser 410. The MPD parser 425 identifies the presentation time of the first access unit of the first segment in the DASH MPD file from 'Media Sync' elements referencing the relevant DASH MPD. The MPD parser 425 provides the relative presentation time of each DASH segment to the presentation engine 430 for presentation at the prescribed presentation time via a display.

The FEC decoding buffer 415 receives MMTP packets with a dedicated packet identifier and copies the packets to the de-jitter buffer 435. If there are packets which are not received until the protection window time of the AL_FEC message signaled by the MMTP signal message parser 410, the FEC decoding buffer 415 applies repair operation(s) to the received packets. If packets are recovered, the FEC decoding buffer 415 copies these recovered packets to the de-jitter buffer 435.

The de-jitter buffer 435 receives MMTP packets from the FEC decoding buffer 415. The de jitter buffer 435 stores these packets until the fixed end-to-end delay of the HRBM message signaled by the MMTP signal message parser 410 is passed from the time specified in the time stamp field of each of the MMTP packets. Then the de-jitter buffer 435 copies the packets to the MMTP de-capsulation buffer 440. The MMTP de-capsulation buffer 440 de-packetizes the MMTP packets received from de-jitter buffer 435 and reconstructs MPUs. The reconstructed MPUs are delivered to the media engines 455. Additional details of MMTP packet processing and the fixed end-to-end delay of the HRBM may be found in US Patent Application Number 2014/0098811 filed Oct. 8, 2013, entitled "METHOD AND APPARATUS FOR MEDIA DATA DELIVERY CONTROL," which is incorporated by reference herein.

The HTTP engine 445 sends requests (e.g., "GET" requests) with a uniform resource locator (URL) received from MPD parser 425 through a broadband network, such as the broadband network 102b in FIG. 1, and receives broadband data as DASH segments in response. The HTTP engine 445 provides the received DASH segments to the DASH segments buffer 450. The DASH segments buffer 450 processes the received DASH segments from the HTTP engine 445 and deliver the processed DASH segments to the media engines 455 when the processing of the DASH segments is completed.

The media engines 455 receive and decode the MPUs and the DASH segments with appropriate decoders. The media engines 455 deliver the decoded results to the presentation engine 430. The presentation engine 430 receives the HTML5 document from the MMTP signal message parser 410. The presentation engine 430 renders the media data from media engines 455 in the location specified by the HTML5 document and at the time provided by the MPEG-H CI parser 420 and/or MPD parser 425. The presentation engine 430 renders and provides the media data for display to a user on a display, such as the display 355 in FIG. 3. In non-limiting examples, the presentation engine 430 may overlay personalized ad information time and location synchronized with the display of relevant associated broadcast media data and/or provide picture-in-picture data of streamed broadband media content positioned in a corner of the display and time synchronized with a relevant associated portion of displayed broadcast media data.

Figure 5:
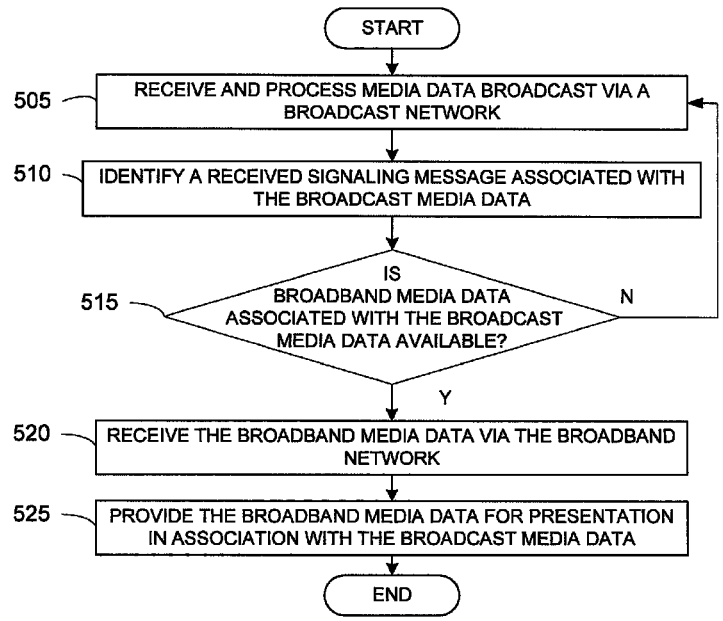
FIG. 5 illustrates a flowchart for an example process for receiving media data over a heterogeneous network according to this disclosure.

FIG. 5 illustrates a flowchart of an example process for receiving media data over a heterogeneous network according to this disclosure. For example, the process depicted in FIG. 5 may be performed by the client device 300 in FIG. 3. The process may also be implemented by the server 200 in FIG. 2.

The process begins with the client device receiving and processing media data broadcast via a broadcast network (step 505). For example, in step 505, the client device may receive the broadcast media data in MMTP packets.

The client device identifies a received signaling message associated with the broadcast media data (step 510). For example, in step 510, the client device may receive an MPT message and filter the message to the MMTP signal message parser 410.

The client device determines whether broadband media data associated with the broadcast media data is available (step 515). For example, in step 515, the client device may determine that additional broadband media data is available via a broadband network based on the signaling message. The MMTP signal message parser 410 in the client device 400 may determine that the broadband media data is available by processing an MPI message and identify a type of broadcast media data that is available based on presentation information included in the MPI message. If the client device determines that broadband media data associated with the broadcast media data is not available, the client device returns to step 505 to continue receiving and processing broadcast media data.

If the client device determines that broadband media data associated with the broadcast media data is available, the client device receives the broadband media data via the broadband network (step 520). For example, in step 520, the client device may request the broadband media data from a server and receive the broadband media data as DASH segments via DASH.

The client then provides the broadband media data for presentation in association with the broadcast media data (step 525). For example, in step 525, the client device may process the broadband media data and broadcast media data for presentation via a display device. The client device may identify a presentation time of the broadband media data, relative to presentation of the broadcast media data, from a media presentation description file and a presentation location for presentation of the broadband media data, relative to presentation of the broadcast media data, on the display device. The client device then provides for display and/or displays the broadband media data on the display device at the location and the time.

Figure 6:
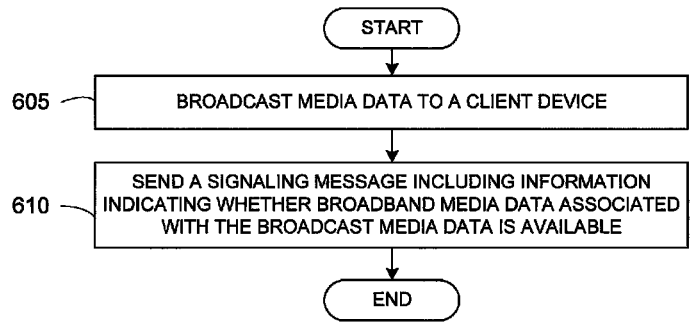
FIG. 6 illustrates a flowchart for an example process for broadcasting media data according to this disclosure.

FIG. 6 illustrates a flowchart of an example process for broadcasting media data according to this disclosure. For example, the process depicted in FIG. 6 may be performed by the server 200 in FIG. 2.

The process begins with the server broadcasting media data to a client device (step 605). For example, in step 605, the server may broadcast the media data to a client device using MMTP packets.

The server also sends a signaling message including information indicating whether broadband media data associated with the broadcast media data is available (step 610). For example, in step 610, the server may send the signaling message to indicate that associated and/or relevant broadcast media data is available via a broadband network for retrieval by the client device using DASH.

Although FIGS. 5 and 6 illustrate examples of processes for receiving media data over a heterogeneous network and broadcasting media data, respectively, various changes could be made to FIGS. 5 and 6. For example, while shown as a series of steps, various steps in each figure could overlap, occur in parallel, occur in a different order, or occur multiple times.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. §112(f) unless the exact words "means for" are followed by a participle.

What is claimed is:

1. A method for receiving media data over a heterogeneous network, the method comprising:
   receiving and processing media data broadcast using Moving Picture Experts Group (MPEG) media transport (MMT) protocol (MMTP) packets via a broadcast network;
   receiving an MMT presentation information (PI) (MPI) message associated with the broadcast media data;
   processing a value of PI_content_type_byte field of MPI_table; and
   delivering data carried as a PI_content_byte of MPI_table to one of:
      a Moving Picture Experts Group (MPEG)-H composition information (CI) parser when the value of the PI_content_type_byte field is MPEG-H CI;
      a media presentation description (MPD) parser when the value of the PI_content_type_byte is dynamic adaptive streaming over hyper-text transport protocol (HTTP) (DASH); and
      a presentation engine when the value of PI_content_type_byte field is HTML5.

2. The method of claim 1, further comprising identifying the value of PI_content_byte field of MPI table included in the MPI message.

3. The method of claim 1, further comprising:
   identifying a time and a location for presentation of broadband media data on a display device; and
   providing the broadband media data to the display device for display at the location and the time.

4. The method of claim 1, further comprising requesting broadband media data from a server and receiving the broadband media data using DASH.

5. The method of claim 3, further comprising identifying the presentation time from a media presentation description file.

6. The method of claim 3, further comprising identifying the presentation location from a hypertext markup language document.

7. The method of claim 3, further comprising providing broadband media data to the display device for display as a picture in picture display.

8. An apparatus for receiving media data over a heterogeneous network, the apparatus comprising:
   one or more receivers configured to receive media data broadcast using Moving Picture Experts Group (MPEG) media transport (MMT) protocol (MMTP) packets via a broadcast network; and
   a controller configured to:
      receive an MMT presentation information (PI) (MPI) message associated with the broadcast media data;
      process a value of PI_content_type_byte field of MPI_table; and
      deliver data carried as a PI_content_byte of MPI_table to one of:
         a Moving Picture Experts Group (MPEG)-H composition information (CI) parser when the value of the PI_content_type_byte field is MPEG-H CI;
         a media presentation description (MPD) parser when the value of the PI_content_type_byte is dynamic adaptive streaming over hyper-text transport protocol (HTTP) (DASH); and
         a presentation engine when the value of PI_content_type_byte field is HTML5.

9. The apparatus of claim 8, wherein the controller is further configured to identify the value of PI_content_byte field of MPI table included in the MPI message.

10. The apparatus of claim 8, wherein the controller is further configured to request broadband media data from a server and receive, via the one or more receivers, the broadband media data using DASH.

11. The apparatus of claim 9, wherein the controller is further configured to:
    identify a time and a location for presentation of broadband media data on a display device; and
    provide the broadband media data to the display device for display at the location and the time.

12. The apparatus of claim 11, wherein the controller is further configured to identify the presentation time from a media presentation description file.

13. The apparatus of claim 11, wherein the controller is further configured to identify the presentation location from a hypertext markup language document.

14. The apparatus of claim 11, wherein the controller is further configured to provide broadband media data to the display device for display as a picture in picture display.

15. A non-transitory computer-readable medium comprising a program for receiving media data over a heterogeneous network, the program comprising program code for:
    receiving and processing media data broadcast using Moving Picture Experts Group (MPEG) media transport (MMT) protocol (MMTP) packets via a broadcast network;
    receiving an MMT presentation information (PI) (MPI) message associated with the broadcast media data,
    processing a value of PI_content_type_byte field of MPI_table; and
    delivering data carried as a PI_content_byte of MPI_table to one of:
       a Moving Picture Experts Group (MPEG)-H composition information (CI) parser when the value of the PI_content_type_byte field is MPEG-H CI;
       a media presentation description (MPD) parser when the value of the PI_content_type_byte is dynamic adaptive streaming over hyper-text transport protocol (HTTP) (DASH); and
       a presentation engine when the value of PI_content_type_byte field is HTML5.

16. The computer-readable medium of claim 15, further comprising program code for identifying a content type of available based on the value of PI_content_byte field in an MPI table included in the MPI message.

17. The computer-readable medium of claim 15, further comprising program code for:
    identifying a time and a location for presentation of broadband media data on display device; and
    providing the broadband media data to the display device for display at the location and the time.

18. The computer-readable medium of claim 15, further comprising program code for requesting broadband media data from a server and receiving the broadband media data using DASH.

19. The computer-readable medium of claim 17, further comprising program code for identifying the presentation time from a media presentation description file.

20. The computer-readable medium of claim 17, further comprising program code for identifying the presentation location from a hypertext markup language document.

* * * * *